United States Patent [19]

Koller

[11] Patent Number: 4,750,966

[45] Date of Patent: Jun. 14, 1988

[54] APPARATUS FOR THE APPLICATION OF AN ADHESIVE TAPE ABOUT THE RIM OF A FLAT SHAPED PART; IN PARTICULAR A SHAPED SHEET METAL PART

[75] Inventor: Hans Koller, Allschwil, Switzerland

[73] Assignee: Ciba-Geigy Corporation, Ardsley, N.Y.

[21] Appl. No.: 940,176

[22] Filed: Dec. 10, 1986

Related U.S. Application Data

[63] Continuation of Ser. No. 700,204, Feb. 11, 1985, abandoned.

[30] Foreign Application Priority Data

Feb. 17, 1984 [CH] Switzerland .......................... 780/84

[51] Int. Cl.⁴ ............................................ B32B 31/04

[52] U.S. Cl. .................................. 156/391; 156/202; 156/216; 156/463; 156/464; 156/468; 156/479; 156/489

[58] Field of Search ........ 156/216, 475, 468, 486–489, 156/574, 577, 391, 461, 463–464

[56] References Cited

U.S. PATENT DOCUMENTS

| | | | |
|---|---|---|---|
| 3,733,237 | 5/1973 | Wolff | 156/468 |
| 3,886,013 | 5/1975 | Bowser | 156/468 X |
| 4,155,798 | 5/1979 | Becker | 156/461 |
| 4,401,503 | 8/1983 | Hertel | 156/463 |
| 4,486,261 | 12/1984 | Koller et al. | 156/463 X |

FOREIGN PATENT DOCUMENTS

| | | |
|---|---|---|
| 444014 | 2/1941 | Belgium . |
| 2252147 | 9/1975 | France . |
| 1528456 | 4/1978 | United Kingdom . |

*Primary Examiner*—David Simmons
*Attorney, Agent, or Firm*—Burns, Doane, Swecker & Mathis

[57] ABSTRACT

The apparatus comprises an application roller pair which rolls an adhesive tape in a U-shaped manner about the rim of a shaped sheet metal part. The adhesive tape is located initially on a carrier ribbon and is drawn jointly with the former off a storage reel by means of conveyor rollers. After its separation from the carrier tape, the adhesive tape is guided via a loose pre-folding roller to the application roller pair, and the carrier ribbon is led off. The application rollers are pivotable about axes extending parallel with the shafts of the application rollers, and are arranged at the same time resiliently displaceably together with the pre-folding roller in the direction of the shafts. The longitudinal section of the pre-folding roller is concave or V-shaped and is additionally supported, displaceably in the direction of the shafts of the application rollers, by means of softer springs, so that they can follow continuously the edge of the metal sheet and urge the adhesive tape against this edge.

17 Claims, 6 Drawing Sheets

APPARATUS FOR THE APPLICATION OF AN ADHESIVE TAPE ABOUT THE RIM OF A FLAT SHAPED PART; IN PARTICULAR A SHAPED SHEET METAL PART

This is a continuation of application Ser. No. 700,204, filed Feb. 11, 1985 and now abandoned.

BACKGROUND OF THE INVENTION

This invention relates to an apparatus for the U-shaped application of an adhesive tape in longitudinal direction about a flat shaped part, in particular a shaped sheet metal part, having a tape guidance which comprises conveying rollers and means for pre-folding the adhesive tape, from which means the pre-folded tape passes between two application rollers being urged against one another, by means of which rollers it can be pressed simultaneously on to the two sides of the shaped flat part being introduced into the tape-folding range.

The gluing over of folded seam connections by means of pressure- or heat-hardenable ahhesives is widely used in the sheet-metal processing industry. Thus, it is for instance conventional in the automobile industry to seal, in this manner, folded seams in certain automobile body parts, in particular doors, thereby preventing the danger of corrosion.

In the automobile industry and similar branches of industry, it is common to use adhesives in liquid or pasty form, for producing such glued-over folded seam connections, which are applied in the shape of a chord on to the metal sheet parts to be connected. This method of applying the adhesive is unsatisfactory in various respects. Firstly, the distribution of the adhesives obtained thereby over the entire folded seam is not sufficiently uniform, which may lead to problems of corrosion, and, on the other hand, adhesives in liquid or pasty form always are problematic in view of aspects of work hygiene. In the manufacture of preservative cans it is also conventional, as shown in U.S. Pat. No. 3,125,056, French Pat. No. 2,252,147 or respectively, Belgian Pat. No. 444,014, to glue over folded seams or seal them by means of adhesive. In doing so, the adhesive is deposited on the crimped rims of the parts to be connected with each other, either in liquid or in pasty form by extrusion or the like, or, otherwise, in the form of a strip of an adhesive foil.

Adhesives in film-, in particular in tape-shape, such as are known, for instance, under the trade names of Araldit-Klebfilm® and Redux-Klebfilm® manufactured by Ciba-Geigy AG, Basel, Switzerland, are more and more widely used, not at the least, because of their advantages in work hygiene. However, in the gluing over of folded seams, for instance, of automobile body parts, such tapes were not used up to now, or were only used to a very limited extent. The reason for this lies above all in the fact that adhesive films are of tough plasticity, and their very low tensile strength considerably encumbers their automatic application. Additional complications occur, when such adhesive strips must be applied to automobile body parts whose folded seams have a complicated, especially a spatially curved configuration. These difficulties are particularly great when the adhesive is to be applied on both sides to the crimped rim, i.e., when the adhesive tape must be placed on to the rim in the shape of a U.

Most of the hitherto known apparatus of the type initially described are only suitable for processing relatively stiff adhesive ribbons (not adhesive tapes) of relatively high tensile strength. This is true, for instance, in the case of the apparatus having a pre-folding channel and pressure pulleys, known from the U.S. Pat. No. 4,155,798.

In recognition of the fact that the failure of the known apparatus to be suitable for the application of tough plastic adhesive tapes of low inherent stiffness and tensile strength on to curved sheet metal rims is, above all, due to the rigid arrangement of the pre-folding channel and of the pressure and application rollers and also by the application rollers being freely rotating (U.S. Pat. No. 4,155,798), an arrangement has also been proposed (European Pat. No. 72,779) in which, firstly, the application roller pair is pivotable as a unit about an axis which extends parallel with the roller shafts and, with regard to the direction of transportation of the tape, spaced from the latter, approximately in the plane of symmetry of the pre-folding channel, and in which, secondly, the application rollers are drivable by a motor via torsion-elastic shafts. This device does indeed represent a jump in improvement over the known state of the art; however, detailed tests in practice have shown that, with regard to the quality of application in particular at higher application speeds, there is still room for decisive improvement of the same.

OBJECTS AND SUMMARY OF THE INVENTION

It is therefore an object of the present invention to provide an apparatus of the initially described kind in which the quality of application at higher application speeds is further essentially improved by modification of the possibilities of movement of the application roller pair to a degree surpassing even the results achieved with the apparatus described in European patent application of earlier priority, No. 84,810,079.8 of Feb. 13, 1984 (Publ. No. 0,117,232; corresponding to U.S. Pat. No. 4,486,261).

This object and others that will become apparent from the following description are attained, in accordance with the invention, in apparatus of the initially described type in which the two application rollers, being resiliently pivotable away from a neutral position about an axis which is parallel with the roller shafts, are arranged in a manner such that their pivoting movement takes place substantially in a plane being defined by their two parallel shafts when in neutral position.

Preferred embodiments of the apparatus according to the invention show one or several of the following features:

the two application rollers are arranged resiliently displaceable in the direction of their shafts;

the pre-folding means are devised as a substantially double cone-shaped, freely rotating pre-folding roller whose diameter decreases (concavely) toward the middle thereof;

the pre-folding roller is arranged resiliently displaceably in common with the application rollers;

the pre-folding roller is additionally arranged resiliently displaceable, relative to the application rollers, in the direction of its axis, the bias opposing this movement being less than that of the common displacement movement of the application rollers and pre-folding roller;

the application roller pair and the pre-folding roller are suspended resiliently pivotable in common about a tilting axis being perpendicular to the plane defined by the shafts of the application rollers;

the two application rollers are supported each in a carrier lever resiliently rotatable about the roller swivel axes, while the spring force biassing the outward pivoting movement of the application rollers for each carrier lever acts in each case only against deflecting movements in a direction away from the respective other application roller, and that the two carrier levers are coupled so that the two application rollers are urged resiliently against each other and always move jointly;

the two application rollers are acted upon each by a separate drive motor having an adjustable, constant torque;

control means for controlling the drive motors are provided, by means of which the torques and the idling speeds of the motors, respectively, of the application rollers driven by them can be adjusted;

the conveying rollers are driven by a separate motor being controlled by the control means, the adhesive tape is guided, prior to its reaching the pre-folding means, via a preferably convexly double cone-shaped control roller which is mounted pivotably about an axis being parallel with its own axis, the deflecting movements of the control roller being dependent on the pull of the adhesive tape; and the control roller is coupled with an electrical measuring transformer which regulates the drive motor for the conveying rollers, in cooperation with the control means, in a manner such that the pull of the adhesive tape remains constant;

the application roller pair and the pre-folding means are mounted on a carrier plate which is supported in a bridle and is resiliently movable in the direction of the roller shafts;

the bridle is supported in a housing, and is tiltable resiliently about a tilting axis being vertical with regard to the plane defined by the shafts of the two application rollers;

the restoring spring for the setting of the pull of the adhesive tape is adjustable;

a cutting device is provided for cutting the applied adhesive tape;

all deflecting movements of the application roller pair are supervised, with regard to their exceeding limit values, by means of limit switches.

BRIEF DESCRIPTION OF THE DRAWINGS

In the following description, the apparatus according to the invention will be explained in more detail at the hand of a preferred embodiment illustrated, by way of example, in the accompanying drawings. There are shown in.

DETAILED DESCRIPTION OF THE EMBODIMENT SHOWN IN THE DRAWINGS

Figure 1:
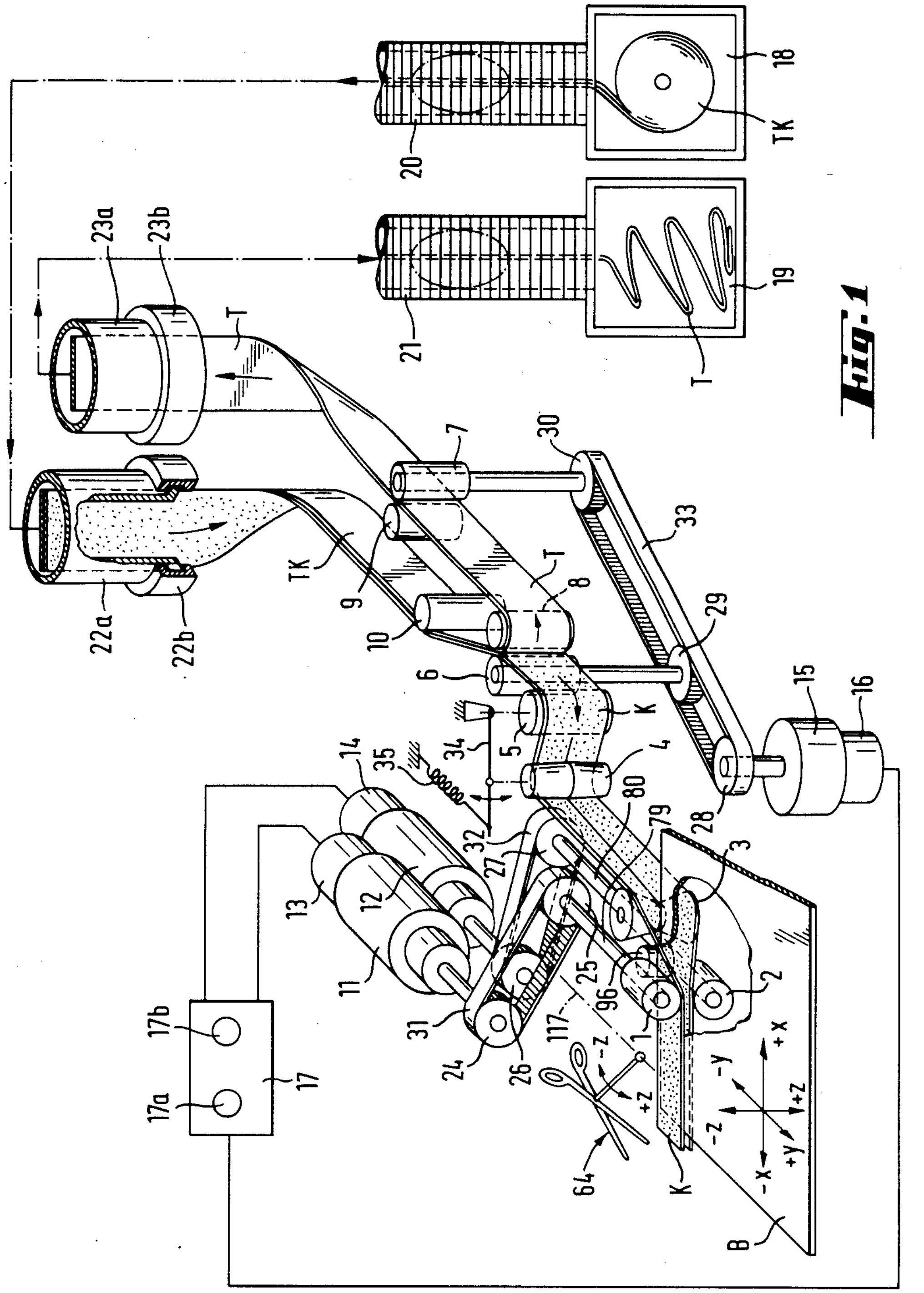
FIG. 1 a perspective schematic overview of the most essential components of the embodiment.

The most essential components of the apparatus as shown in FIG. 1 are two application rollers 1 and 2, a pre-folding roller 3, a control roller 4, a deflecting roller 5, two conveying rollers 6 and 7, with two associated counter-pressure rollers 8 and 9, a further deflecting roller 10, two drive motors 11 and 12 equipped with tacho-alternators 13 and 14, respectively, for driving the application rollers 1 and 2, a drive motor 15 equipped with a tacho-alternator 16 (FIG. 6), pertaining thereto, for driving the conveying rollers 6 and 7, a control unit 17 for the three drive motors, a cassette 18, a storage reel of adhesive ribbon TK, consisting of a carrier ribbon T and a tape K of adhesive film carried by the same, a receptacle 19 for peeled-off carrier ribbon T and two hose lines 20 and 21 for the feeding of adhesive ribbon TK to the conveying rollers 6 and 7 or, respectively, the return of the peeled-off carrier ribbon T to the receptacle 19. The hose lines 20 and 21 are detachably connected, respectively, by means of bayonet catches 22*a* and *b* as well as 23*a* and *b*, with the application head proper which contains all parts except the cassette 18; the receptacle 19 as well as the control unit 17 are arranged stationary outside the application head and do not follow the movements of the latter to be explained hereinafter. The drive of the application rollers 1 and 2 and the conveying rollers 6 and 7 is effected via belt pulleys 24 to 30 and transmission belts 21 to 33 pertaining thereto.

Figure 3:
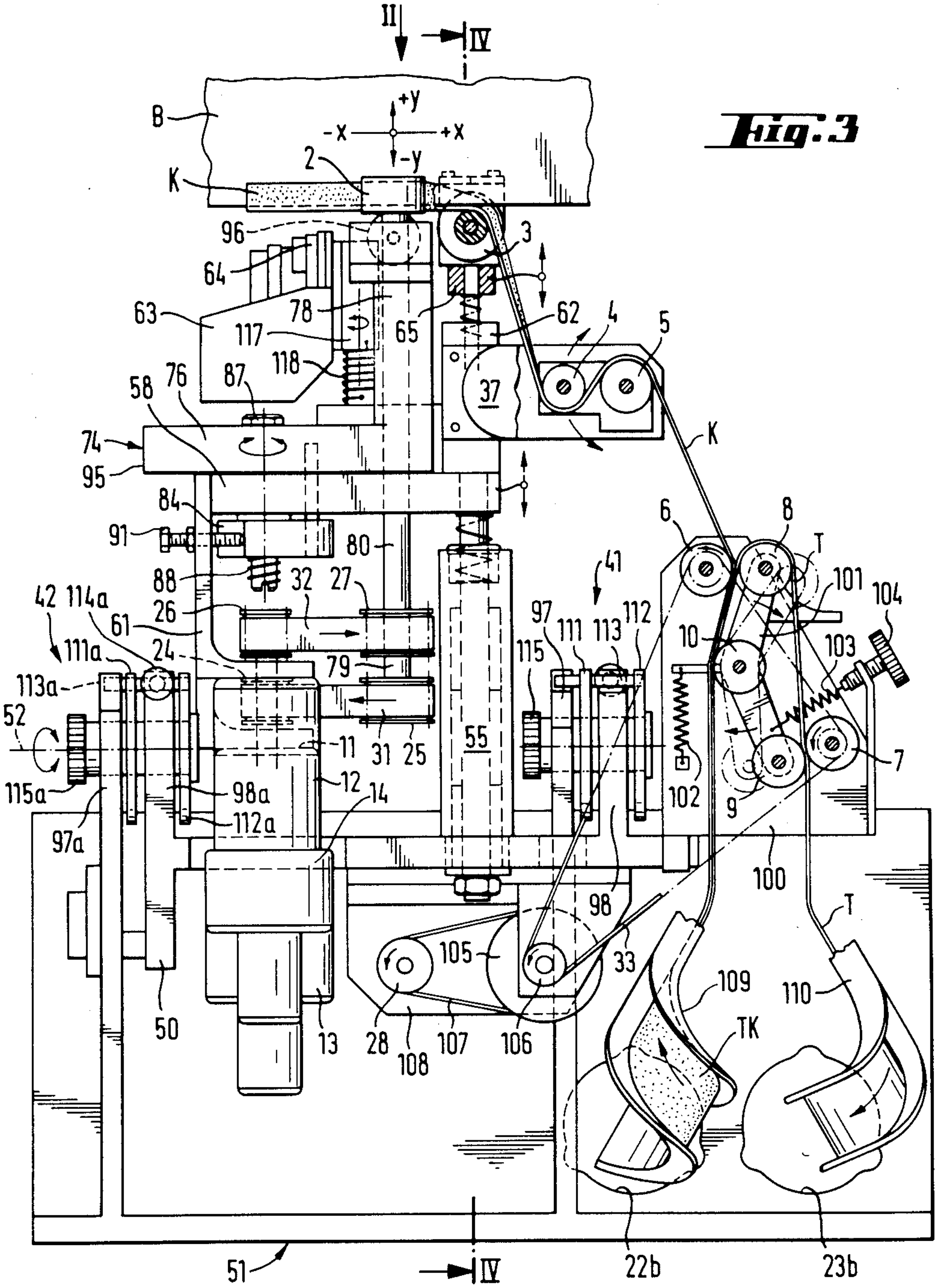
FIG. 3 is a a sectional view in a plane indicated by III—III in FIG. 2 and taken in the direction of the -Z-axis in FIG. 1.

The mode of operation of the apparatus is the following:

The adhesive ribbon TK consisting of the carrier ribbon T and the adhesive film K, passes from the storage cassette 18 via the hose 20 and via a guiding channel 109, visible in FIG. 3, to the conveying roller pair 6, 8, where the carrier ribbon T is peeled away from the adhesive film K. The adhesive film K is guided via the deflection roller 5, the control roller 4 and the pre-folding roller 3 to the application rollers 1 and 2 which apply it folded to adopt a U-shaped cross-section, about the rim, to be provided with the folded film, of a shaped metal sheet part B. The drawn-off carrier ribbon T is guided back via a further guiding channel 110, shown in FIG. 3, and the hose 21 to the receptacle 19, by means of a suction device (not shown). The cross sectional areas of the hose 20 and of the guiding channel 109 for the adhesive ribbon TK are oval, and the curves of these parts are chosen in a manner such that the adhesive ribbon can slide thereon essentially only with its non-adhesive ribbon side. The oval cross section prevents a twisting of the adhesive ribbon.

The conveyance of the adhesive ribbon TK is carried out via the conveying rollers 6 and 7, with the pulling forces attacking essentially only at the pull-resistant carrier ribbon T, the pull-sensitive adhesive film K not being stressed. The conveyance of the adhesive film K, being peeled from the carrier ribbon T and unprotected, is effected by the two application rollers 1 and 2, the required (low) pull on the tape being, however, controlled by the control roller 4 against becoming excessive.

Figure 6:
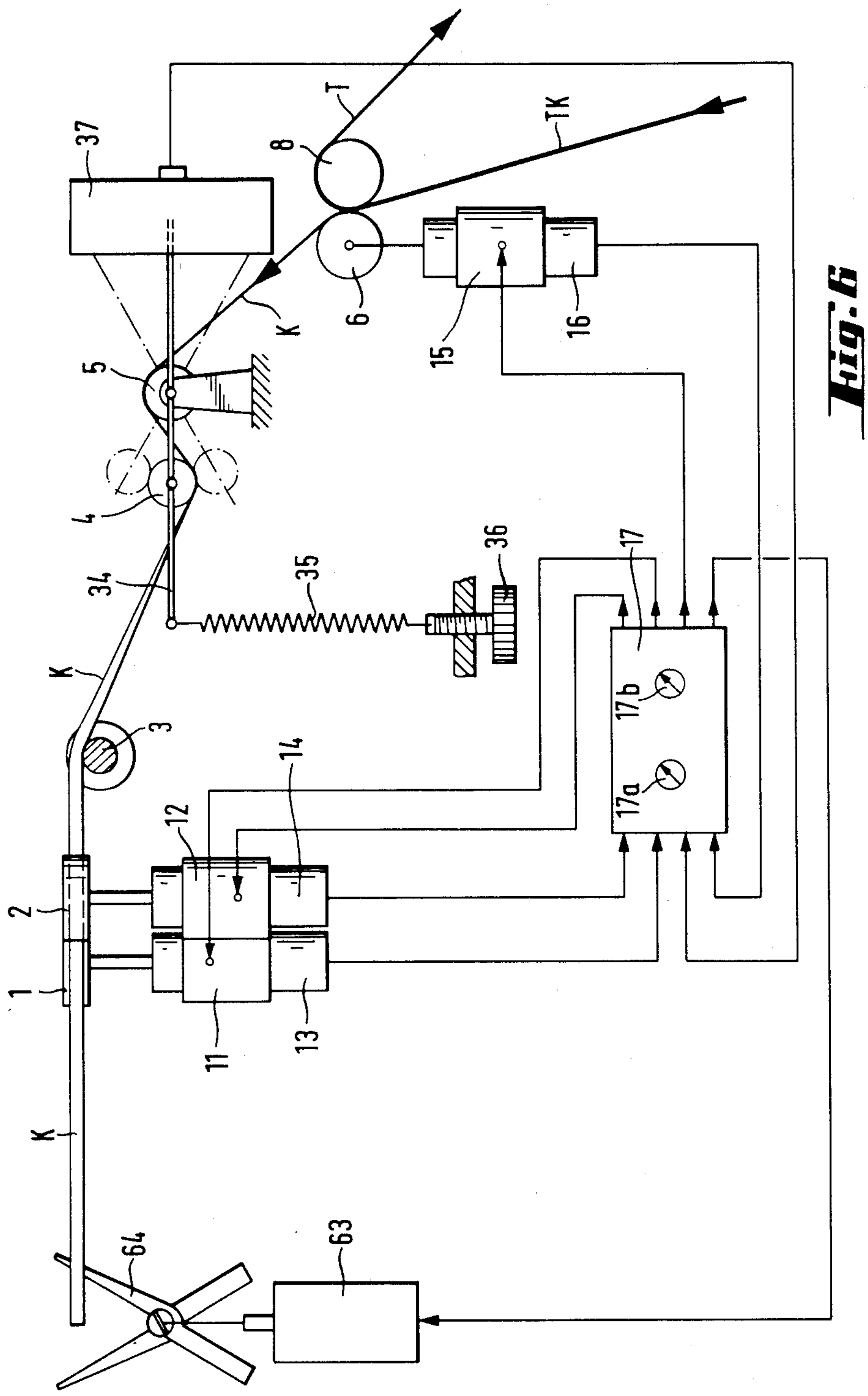
FIG. 6 is an electrical circuit diagram of the drive control means of the apparatus.

The control roller 4 is mounted on a control lever 34 being pivotable about the shaft of the deflecting roller 5 and being at the same time biassed by means of a tension spring 35, whereby the adhesive film K is lightly tensioned at all times. The magnitude of its basic tension is adjustable by means of a knurled-head screw 36 (FIG. 6). The control lever 34 is coupled with a potentiometer 37 (FIG. 6) in a manner such that a swivelling motion of the control roller 4 causes a corresponding shift of the potentiometer 37. The potentiometer is connected with the control unit 17 and controls, in cooperation with the latter, the drive motor 15 for the conveyance (ribbon supply) of the tape in a manner such that the pull in the adhesive film K remains constant independently of the movements, to be explained hereinafter, of the individual rollers. The circumferential speed of the conveying roller pair 7,9 pulling off the carrier ribbon T is slightly larger than that of the feed roller 8 in order to compensate for any occurrence of slippage. The control roller 4 is preferably shaped as a convex double cone; thereby are achieved a certain preliminary shaping of the adhesive film K, on the one hand, and a centering of the adhesive film, on the other hand.

The applicator head is attached to a motion device (not shown) such as a robot (of known construction). The latter is programmed in a manner such that the two application rollers 1 and 2 move exactly along, and embrace, the rim of the shaped sheet metal part and apply the adhesive film K to narrow marginal zones on both side of the metal sheet part while doing so. The precise construction of the application head has been illustrated in FIGS. 2 and 5, in which coordinate axes X, Y and Z have been entered to facilitate understanding, with the Z-axis extending vertically when the robot is in rest position. In other respects, the Z-axis indicates the momentary normal on to the surface of the shaped metal sheet part B, the Y-axis the normal on to the metal sheet edge in the metal sheet plane, and the X-axis extends tangentially relative to the metal sheet edge in the (momentary) metal sheet plane.

All parts of the applicator head are mounted in a bracket 50 which is supported for resilient tilting (±Z-direction) about an axis 52, being parallel with the X-axis, in a housing 51 which is open at the front.

The housing 51 itself is fastened to the motion device by way of a flange 53. The bracket 50 carries two cylinders 54 and 55 in which two guide rods 56 and 57 are positioned displaceably in ±Y-direction. There is connected with these guide rods a carrier plate 58, which bears all remaining parts of the applicator head with the exception of the conveying and feed rollers, and which is supported resiliently on the two cylinders 54 and 55 via two springs 59 and 60.

On the carrier plate 58 there are mounted by means of an angle member 61 the two drive motors 11 and 12 and the associated tacho-alternators 13 and 14; they therefore follow the ±Y movement of the carrier plate. On the carrier plate 58 there is mounted a further carrier element 62, on which there are fastened the pre-folding roller 3, the control roller 4 with the potentiometer 37, and the deflector roll 5 as well as a cutting device (scissors) 64 actuated by an electromagnet 63. (In FIG. 2, this cutting device has been omitted for the sake of clarity.)

Figure 2:
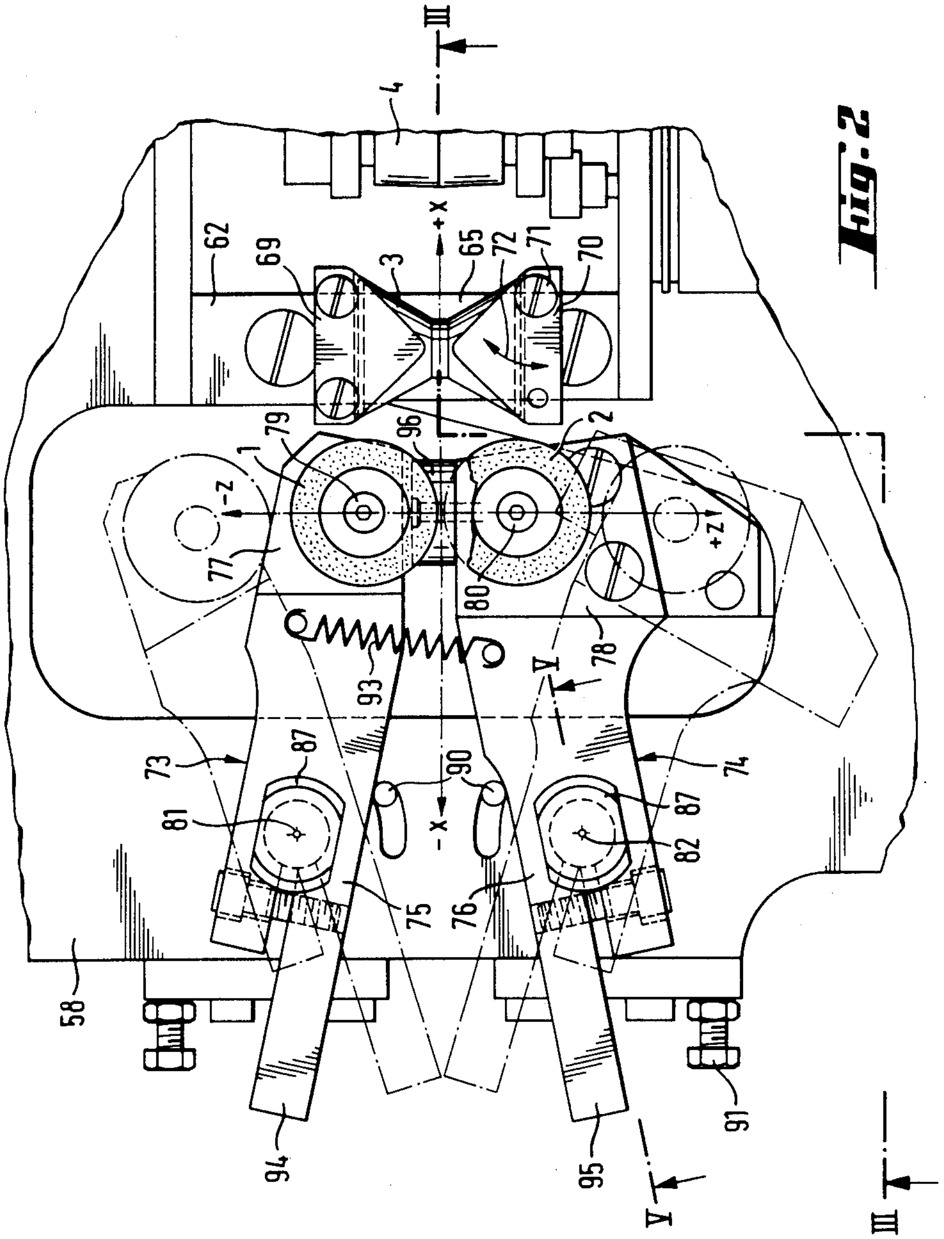
FIG. 2 a frontal view, taken in the direction of the -Y-axis, of the application head proper of the embodiment shown in FIG. 1, and in a plane indicated by II—II in FIG. 3.
Figure 4:
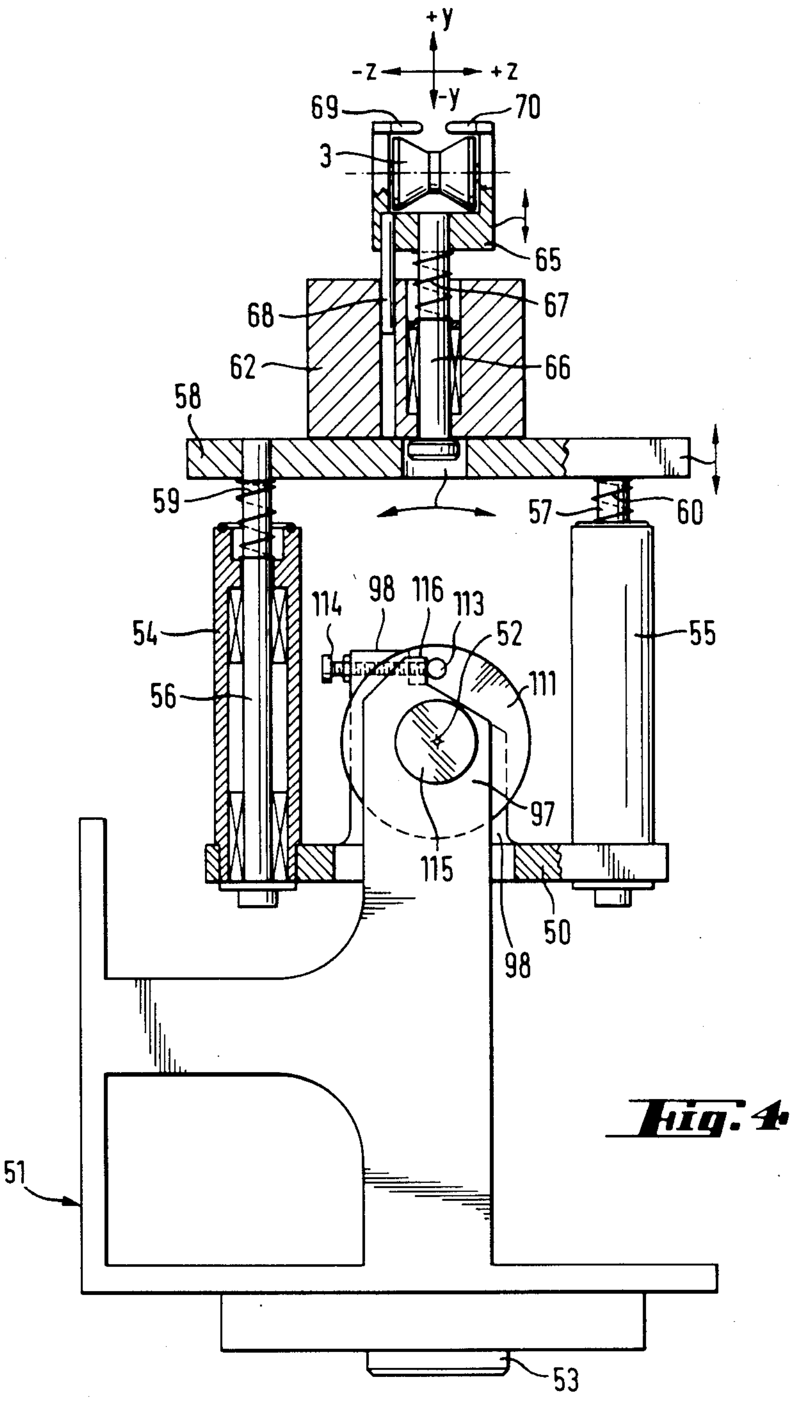
FIG. 4 is a sectional view taken in a plane indicated by IV—IV in FIG. 3.

As shown in FIGS. 2 and 4, the concave double-conical pre-folding roller 3 is rotatably supported in a U-bracket 65. The U-bracket is connected with a sliding rod 66 which is supported displaceably, in ±Y-direction, in the carrier element 62 against the bias of a spring 67. A guiding bar 68 secures the U-bracket 65 against turning about the Y-axis. The pre-folding roller 3 is also movable resiliently independently of the possibilities of movement of the remaining parts of the applicator head, the spring rate of the spring 67 being smaller (the spring 67 thus being softer) than that of the springs 59 and 60 against which the carrier plate 58, together with all elements mounted thereon, is resiliently movable as a whole in Y-direction.

This independent possibility of deflecting movement by the pre-folding roller 3 affords an optimal adaptation to the edge of the shaped metal sheet parts even in the case of complicated spatial edge configurations.

On the U-bracket 65 there are fastened at its front two substantially triangular guard shields 69 and 70. The upper guard shield 69 is mounted fixedly, the lower guard shield 70 is pivotable, against the force of a blade spring (not shown), about the fastening screw 71 in the direction of the arrow 72. These two guard shields 69 and 70 follow the rim of the shaped metal sheet part B which, in operation, passes between them, and they cause, depending on the curvature of the part B, the afore-mentioned tilting movement of the bracket 50 about axis 52 ±-Z-tilting movement).

Figure 5:
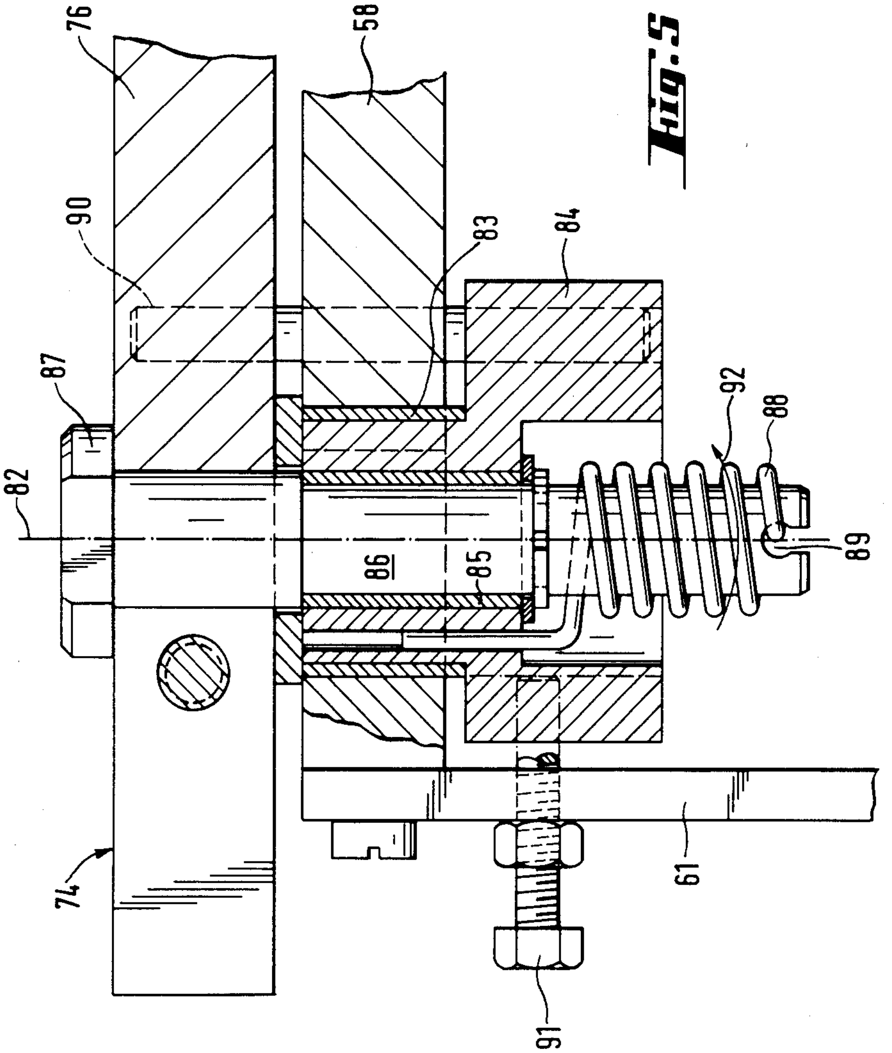
FIG. 5 is a sectional view taken in a plane indicated by V—V in FIG. 2.

On the carrier plate 58, there are supported two carrier levers 73 and 74, of L-shaped configuration, pivotable about rotary axes parallel with the Y-axis, each of these levers having two legs forming a right angle between them, the lever 73 having legs 75 and 77, and the lever 74 having the legs 76 and 78 (FIGS. 2, 3 and 5). Each of the legs 75 and 76, respectively, of the two carrier levers 73 and 74 extends parallel with the carrier plate 58, and is mounted pivotable on the same, while each of the other legs, 77 and 78, extends vertically thereto in Y-direction and serves as a pivot bearing for the shafts 79 and 80, respectively, of the corresponding one of the application rollers 1 and 2. These rollers 1 and 2 are thus pivotable, in the sense of a ±Z-movement, about the axes of rotation, of two carrier shafts designated in FIG. 2 by 81 and 82, at the fulcra of the carrier levers 73 and 74.

The structure of the pivot bearings for the two carrier levers results from FIG. 5. In the carrier plate 58, there is inserted rotatably an abutment member 84 via a bushing 83. Therein is rotatably supported a shaft 86 via a further bushing 85. This shaft 86 bears the carrier lever 74 and is firmly connected with the same, for rotation in common, by means of a detachable fastening element 87. On the shaft 86, there is seated a coil spring 88, one end of which engages a slot 89 at the end of the shaft 86 and whose other end is held in the abutment member 84. In the abutment member 84, there is also fastened a follower rod 90 which extends through an arcuate slot (not shown) in the carrier plate 58 and laterally abuts the carrier lever 74. A stop screw 91 in the angle member 61 acts together with the abutment member 84 and limits the rotational movement of the latter in the direction of the arrow 92.

The base tension of the coil spring 88 is adjustable by means of the fastening element 87. Without external application of force, the carrier lever 74 is in a neutral position, shown fully drawn out in FIG. 2, in which there are in engagement or abutment, respectively, with each other, the carrier lever 74 with the follower rod 90, on the one hand, and the abutment member 84 with the stop screw 91, on the other hand. The neutral position of the carrier lever 74 can be adjusted by means of the stop screw 91. Now, when the lower application roller 2 and together therewith the carrier lever 74 are deflected downwardly, then, the latter lifts off the follower rod 90 and the restoring effect of the spring 88 begins. When the external force is absent, then the carrier lever 74 will move again upwardly due to the spring effect. In doing so it can not move by itself further then the neutral position, for, in the moment when the neutral position is reached, the carrier lever will enter into engagement with the follower rod 90 and the spring effect will then cease instantly.

The resilient pivot bearing for the upper carrier lever 73 is built in exactly the same manner, however, its operation relatively to upward and downward is mirror symmetrical to that of the carrier lever 74. In order to guarantee that the two application rollers 1 and 2 will always abut safely against the rim of the shaped metal sheet part, independently of the prevailing deflection upwardly or downwardly, the legs 75 and 76 of the two carrier levers 73 and 74 are urged toward each other by means of a coupling spring 93.

The two carrier levers 73 and 74 are provided, respectively, with extensions 94 and 95. With the aid of these, their legs 75 and 76 can be spread apart, for instance, to facilitate inserting the adhesive film K.

On the lower carrier lever 74 a bumper roller 96 is freely rotatably supported (FIGS. 2,3). This bumper roller runs along the edge of the shaped metal sheet part and causes the deflective movements of the carrier plate 58 and all elements mounted thereon, in ±-Y-direction depending on the configuration of that edge.

The two spring-suspended pivot bearings 41 and 42 between the housing 51 and the bracket 50 are devised analogous with the pivot bearings of the carrier levers 73 and 74. Hereinafter this will be shown for the example of the right-hand pivot bearing 41 in FIG. 3 in connection with FIGS. 4 and 5.

The wall part 97 of the housing corresponds to the carrier lever 74 in FIG. 5, the flange 98 of the bracket 50 to the carrier plate 58. The two rotary disks 111 and 112 correspond to the abutment member 84, the follower pin 113 to the follower rod 90, the stop screw 114 to the stop screw 91, and, finally, the tensioning element 115 for the hidden coil spring corresponds to the fastening element 87 in FIG. 5.

The coil spring not visible in the drawing acts between the wall part 97 and the two rotary disks 111 and 112 being firmly connected for rotation in common. The stop screw 114 is seated on the flange 98 of the bracket 50 and acts upon the follower pin 113 and thereby upon the two rotary disks. It renders the neutral position of the bracket 50 adjustable with regard to the housing 51.

In the case of a downward deflection of the bracket 50, i.e., a tilting movement of the application rollers 1 and 2 in +Z direction, the follower pin 113 is disengaged from the nose 116 of the wall part 97 so that the spring is activated and restores the bracket 50 to its neutral position, as soon as the deflecting force ceases. When reaching the neutral position, the follower pin 113 and the nose 116 make contact with each other, and the effect of the spring is eliminated.

This applies analogously to the left-hand pivot bearing 42, however, with the opposite sense of rotation. The bearing 42 comprises a housing wall part 97*a*, a bracket flange 98*a*, two rotary disks 111*a* and 112*a* and a follower pin 113*a*, a stop screw 114*a* and a tensioning element 115*a*.

The pivot bearing 42 on the left in FIG. 3 functions in an analogous manner, however with regard to deflections of the application rollers 1 and 2 in upward direction. The two pivot bearings 41 and 42 thus are mutually complementary and restore the bracket 50, and thereby the application rollers 1 and 2, from each deflection back to the neutral position.

According to FIG. 3, there is mounted laterally on the bracket 50 a bearing block 100 on which are supported the deflection roller 10 and the conveying rollers 6 and 7. A swivel part 101 is articulatedly mounted on the bearing block 100 and, bears the feed rollers 8 and 9 exerting counter-pressure on the rollers 6 and 7, respectively. This swivel part 101 can be turned about the shaft of the deflecting roller 10 and is held, by means of two springs 102 and 103, in the position shown fully drawn in FIG. 3, in which the conveying rollers 6 and 7 and feed rollers 8 and 9 are resiliently urged against each other and can thus exercise their conveying function. The tension of the spring 103 can be adjusted by means of a knurled-head screw 104. In order to introduce the adhesive ribbon TK and the peeled-off carrier ribbon T, the swivel part 101 can be swivelled into the position indicated in FIG. 3 in dashed lines, whereby a gap is opened between the conveying rollers and the respective feed rollers.

The drive of the two conveying rollers 6 and 7 is effected via the transmission belt 33 which, however, differently from FIG. 1, is not seated directly on the belt pulley 28 of the drive motor 15, but is connected with the latter by a transmission drive consisting of two further pulleys 105 and 106, being firmly connected with each other for rotation in common, and of a further belt 107. The drive motor 15 is mounted on a flange 108 of the bracket 50.

On the bearing block 100 there are furthermore fastened, in a manner not shown, the two guiding channels 109 and 110 for the tape ribbon TK and for the peeled-off carrier ribbon T. These guiding channels 109 and 110 extend to the intermediate vicinity of the headside parts 22*b* and 23*b* of the bayonet catches for the hose lines 20 and 21, but are not mechanically connected with the latter. The parts 22*b* and 23*b* are arranged at that side of the housing 51, of the application head, which is the upper side in normal position. In FIG. 1, the guiding channels 109 and 110 have not been illustrated for the sake of clarity.

The application rollers 1 and 2 are coated with silicone and are exchangeably mounted on their respective shafts 79 and 80. Their operation is effected with a constant torque being adjustable via the control unit 17, and with equally constant, adjustable idling speed, i.e., the two drive motors 11 and 12 are so controlled by the control unit 17, with feedback by the tacho-alternators 13 and 14, that the application rollers 1 and 2 are actuated, on the one hand, at a constant speed, and that, on the other hand, they have a constant idling speed. The torque and the idling speed can be preselected by means of two corresponding setting elements 17*a* and 17*b* of the control unit 17. This mode of operation affords, without connection and/or information exchange with the control of the motion device (robots) an optimal adaptation of all roller speeds, i.e. speeds of the application rollers and conveying rollers, to the velocity of movement of the robots, including compensation for slippage.

The two application rollers 1 and 2 possess, in accordance with the foregoing description, several possibilities for resilient compensating movements. They are, firstly, each by itself, pivotable about the axes of rotation 81 and 82 of their respective carrier levers 73 and 74, in ±Z direction parallel with the X-Z plane; furthermore, they are displaceable in directions parallel with their axes of rotation (±Y movement), and, finally, they are tiltable in common about an axis 52 being parallel with the X-axis.

The pre-folding roller 3, the surface of which consists of PTFE (Teflon) participates essentially in the compensating movements, i.e., in tilting movements, and/or sliding movements, common to the application rollers 1 and 2. Additionally, the pre-folding roller 3 can also move resiliently in Y-direction with regard to the rollers 1 and 2. The pre-folding roller 3, being thus urged resiliently against the edge of the shaped metal sheet part, fulfills above all the task of pressing the adhesive film K, in its immediate folding zone, on to the edge of the sheet metal part B, so that, in that zone, no hollow space is formed, nor does the folded tape stick together.

The particular mode of driving the application rollers 1 and 2 and the conveying rollers 6 and 7 constitutes, together with the particular possibilities of movement of the application rollers and the pre-folding roller or, respectively, of the structural elements bearing them, a prerequisite for a uniform application of the adhesive film K, free from warping, on the shaped metal sheet part B even at high processing speeds and complicated configurations of the edges of the latter part.

As has been mentioned hereinbefore, the applicator head is equipped with a cutting device in the form of scissors 64 or a thermo-cutter. This cutting device (FIG. 3) is mounted on the carrier plate 58, or respectively, on the carrier element 62, and is pivotable, for reasons of safety, about an axis 117 being parallel with the Y-axis, against the force of a spring 118, out of the conveying path of the adhesive film. In case the cutting device becomes stuck in the outwardly swivelled position, for any reasons whatsoever, a limit switch takes care that the motion device is stopped at once. Actually, all resilient compensating movements of the application rollers 1 and 2, namely a ±Z-swivel movement of the carrier levers, a ±Z-tilting movement and/or a ±Y-sliding movement, are monitored by means of limit switches. When exceeding the respective extreme positions, the motion device is at once arrested so that any overloading of the applicator head is avoided.

In the case of simple metal sheet contours, it is also possible to do without the second drive of the two applicator rollers 1 and 2, and only to connect one tacho-alternator with one of the two application rollers, which would in that case be freely rotating, and would then serve, as hitherto, as a reference for the drive of the ribbon-conveying motor 15.

What is claimed is:

1. An apparatus for the application of an adhesive tape or film, in longitudinal direction, about the rim of a flat-shaped part of the shaped metal sheet part type, said tape to embrace said rim in a configuration of substantially U-shaped cross section, said apparatus comprising tape-guiding means comprising conveying rollers and means for pre-folding the adhesive tape, a pair of application rollers having application roller shafts adapted for receiving in a tape-folding range pre-folded tape from said pre-folding means and for pressing said pre-folded tape simultaneously on to the two sides adjacent said rim of said flat-shaped part when the latter part is being introduced into said tape-folding range, and application roller-moving means adapted for resilient pivoting of each of said two application rollers, away from a neutral position, about an axis extending parallel with said roller shafts, the pivoting movement of said pair of application rollers taking place substantially in a plane being defined by said roller shafts when in neutral position; and comprising two carrier levers each supporting one of said application rollers, roller swivelling means for each of said carrier levers being adapted for imparting the pivoting movement to the application roller supported thereby about the respective roller pivot axis, first biasing means for biasing the pivoting movement of at least one of said application rollers in a direction toward the other roller, and coupling means for resiliently coupling said two carrier levers with one another, whereby said two application rollers are urged resiliently against each other and always move jointly.

2. An apparatus as defined in claim 1, wherein said application roller-moving means further comprise first displacing means adapted for affording resilient displacement of said two application rollers in the direction of said application roller shafts thereof.

3. An apparatus as defined in claim 2, wherein said pre-folding means comprise a substantially double cone-shaped, freely rotating pre-folding roller whose diameter decreases toward the middle thereof with a concave contour.

4. An apparatus as defined in claim 3, wherein said application roller-moving means comprise common displacing means adapted for effecting displacement of said pre-folding roller in common with said application rollers, and second biassing means for rendering said common displacement resilient.

5. An apparatus as defined in claim 4, wherein said apparatus further comprises second displacement means for affording additional displacement of said pre-folding roller, relative to said application rollers, and third biassing means for rendering said additional displacement resilient, the bias of said third biassing means being less than the bias of said second biassing means.

6. An apparatus as defined in claim 5, wherein said application roller moving means further comprise suspending and tilting means for said pair of application rollers and said pre-folding roller and being adapted for suspending these three rollers in a manner such that they are resiliently pivotable in common about a tilting axis being perpendicular to a plane defined by said two application roller shafts.

7. An apparatus as defined in claim 1, wherein said application roller-moving means comprise two separate drive motors having each an adjustable, constant torque and being each drivingly associated with one of said application rollers, respectively.

8. An apparatus as defined in claim 7, wherein said application roller-moving means comprise control means adapted for controlling the torques and idling speeds of said drive motors in an adjustable manner.

9. An apparatus as defined in claim 8, further comprising a separate motor drivingly associated with said conveying rollers, said control means being adapted for controlling the torque and speed of said separate motor; a control roller having a control roller axis; means for imparting pivoting movements to said control roller about an axis extending parallel with said control roller axis; restoring spring means adapted for biassing said pivoting movements of said control roller; said control roller being adapted for guiding said adhesive tape toward said pre-folding means, any pivoting means of said control roller being dependent on the pull of said adhesive tape; and an electrical measuring transformer, being coupled with said control roller and adapted for regulating said separate motor for said conveying rollers in cooperation with said control means in a manner such that the pull of the adhesive tape remains constant.

10. An apparatus as defined in claim 2, wherein said first displacing means comprise a carrier plate, adapted for carrying said application roller pair and said pre-folding means, and a bridle, said carrier plate being supported in said bridle in a manner such as to be resiliently movable in the direction of said application roller shafts.

11. An apparatus as defined in claim 10, further comprising a housing, said bridle being supported in said housing so as to be tiltable resiliently about a tilting axis, said tilting axis extending vertical to a plane defined by said two application roller shafts.

12. An apparatus as defined in claim 9, wherein said restoring spring means comprise adjusting means for adjusting the spring force thereof, thereby adjusting the pull on said adhesive tape.

13. An apparatus as defined in claim 1, further comprising cutting means for cutting off the adhesive tape after its application to said shaped flat part.

14. An apparatus as defined in one of claims 1 through 13, further comprising monitoring means for supervising any movements of said pair of application rollers, and limit switches for arresting said movements when exceeding pre-set limit values therefor.

15. An apparatus as defined in claim 9, wherein said control roller has the shape of a convex double cone.

16. An apparatus for the application of an adhesive tape or film, in longitudinal direction, about the rim of a flat-shaped part of the shaped metal sheet part type, said tape to embrace said rim in a configuration of substantially U-shaped cross section, said apparatus comprising tape-guiding means comprising conveying rollers and means for pre-folding the adhesive tape, a pair of application rollers having application roller shafts adapted for receiving in a tape-folding range pre-folded tape from said pre-folding means and for pressing said pre-folded tape simultaneously on to the two sides adjacent said rim of said flat-shaped part when the latter part is being introduced into said tape-folding range, and application roller-moving means adapted for resilient pivoting of each of said two application rollers, away from a neutral position, about an axis extending parallel with said roller shafts, the pivoting movement of said pair of application rollers taking place substantially in a plane being defined by said roller shafts when in neutral position; first biasing means for biasing the pivoting movement of at least one of said rollers in a direction toward the other roller, means for adjusting the force of the first biasing means; the means for adjusting the force of the first biasing means includes a torsional spring having one end operatively connected to the roller shaft and a second end operatively connected to an abutment member, and means for rotating the abutment member relative to the roller shaft to affect the force of the torsional spring.

17. The apparatus of claim 16, further comprising stop means operatively connected to the abutment for adjustably limiting pivotal movement of the rollers towards one another.

* * * * *